(12) United States Patent
Yoshino et al.

(10) Patent No.: US 12,064,871 B2
(45) Date of Patent: Aug. 20, 2024

(54) GAS PRESSURE DETECTION DEVICE, ROBOT HAVING GAS PRESSURE DETECTION DEVICE, AND GAS PRESSURE DETECTION METHOD OF THE SAME

(71) Applicant: KAWASAKI JUKOGYO KABUSHIKI KAISHA, Kobe (JP)

(72) Inventors: Koji Yoshino, Kobe (JP); Hideaki Kanou, Kobe (JP); Yuki Takeuchi, Kakogawa (JP); Keisuke Kawaguchi, Kobe (JP); Sosuke Abe, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 586 days.

(21) Appl. No.: 17/290,647

(22) PCT Filed: Nov. 28, 2019

(86) PCT No.: PCT/JP2019/046561
§ 371 (c)(1),
(2) Date: Apr. 30, 2021

(87) PCT Pub. No.: WO2020/111179
PCT Pub. Date: Jun. 4, 2020

(65) Prior Publication Data
US 2021/0387362 A1 Dec. 16, 2021

(30) Foreign Application Priority Data
Nov. 30, 2018 (JP) .................................. 2018-224917

(51) Int. Cl.
| | |
|---|---|
| *B25J 19/02* | (2006.01) |
| *B25J 19/00* | (2006.01) |
| *G01L 19/08* | (2006.01) |

(52) U.S. Cl.
CPC ............ *B25J 19/02* (2013.01); *B25J 19/0012* (2013.01); *G01L 19/083* (2013.01)

(58) Field of Classification Search
CPC ...... B25J 19/02; B25J 19/0012; G01L 19/083
See application file for complete search history.

(56) References Cited

U.S. PATENT DOCUMENTS

| | | | |
|---|---|---|---|
| 6,408,225 B1 | 6/2002 | Ortmeier et al. | |
| 2010/0212305 A1 | 8/2010 | Runesson et al. | |
| 2020/0164529 A1* | 5/2020 | Kitamura | ............. B25J 19/0012 |

FOREIGN PATENT DOCUMENTS

| | | |
|---|---|---|
| EP | 1 105 258 B1 | 3/2004 |
| JP | 5512706 B2 | 6/2014 |
| WO | 2017/155071 A1 | 9/2017 |

* cited by examiner

*Primary Examiner* — Jaime Figueroa
*Assistant Examiner* — Jamal A Shah
(74) *Attorney, Agent, or Firm* — Oliff PLC

(57) ABSTRACT

A gas pressure detection device 10 detects a decrease in a pressure of gas of a gas balancer 8 of a robot 2. The gas pressure detection device 10 includes a calculating part configured to calculate a parameter $Rt(\theta)$ indicating a magnitude relation between a reference pressure $Pa(\theta)$ at a rotational angle $\theta$ of a rotary arm 14 and a measured pressure $Pt(\theta)$ measured at the rotational angle $\theta$, calculate a plurality of parameters $Rt(\theta)$ based on a plurality of measured pressures $Pt(\theta)$ at different measurement times, and calculate a moving average $Rtj(\theta)$ of the parameter $Rt(\theta)$ at a measurement time tj that is a j-th measurement time of the measured pressure $Pt(\theta)$ (j representing a natural number of 2 or above), and a determining part configured to compare the moving average $Rtj(\theta)$ with a reference value R to detect the decrease in the pressure of the gas.

8 Claims, 5 Drawing Sheets

GAS PRESSURE DETECTION DEVICE, ROBOT HAVING GAS PRESSURE DETECTION DEVICE, AND GAS PRESSURE DETECTION METHOD OF THE SAME

TECHNICAL FIELD

The present disclosure relates to a gas pressure detection device which detects a pressure of gas of a gas balancer, a robot having the gas pressure detection device, and a method of detecting the gas pressure using the gas pressure detection device.

BACKGROUND ART

JP5512706B2 discloses a robot having an arm, a rotary arm rotatably coupled to the arm, and a gas spring as a gas balancer which reduces a rotational load of the rotary arm. This robot detects a pressure in the gas balancer. If the pressure deviates from a given pressure value, the pressure is adjusted. Thus, the robot requires less maintenance of the gas balancer.

REFERENCE DOCUMENT OF CONVENTIONAL ART

Patent Document

[Patent Document 1] JP5512706B2

DESCRIPTION OF THE DISCLOSURE

Problem to be Solved by the Disclosure

In the gas balancer, the given pressure value is set as a pressure at which the robot can move. Based on a magnitude relation between the given pressure value and an actual measured pressure, a decrease in the pressure in the gas balancer is detected. However, a large difference may be detected between the given pressure value and the measured pressure, although actually the pressure in the gas balancer does not decrease greatly. Such a false detection of the decrease in the pressure causes an unnecessary stop of the robot or checking of the gas balancer. This false detection of the pressure decrease impedes the productivity of the robot.

One purpose of the present disclosure is to provide a gas pressure detection device capable of reducing a false detection of a decrease in a pressure of gas of a gas balancer, a robot having the gas pressure detection device, and a method of detecting the decrease in the gas pressure using the gas pressure detection device.

SUMMARY OF THE DISCLOSURE

A gas pressure detection device according to the present disclosure, which is provided to a robot having an arm supporting part, a rotary arm rotatably supported by the arm supporting part, a gas balancer configured to reduce a rotational load of the rotary arm, and a pressure sensor configured to measure a pressure of gas of the gas balancer, detects a decrease in the pressure. The gas pressure detection device includes a calculating part configured to calculate a parameter $Rt(\theta)$ indicating a magnitude relation between a reference pressure $Pa(\theta)$ at a rotational angle $\theta$ of the rotary arm and a measured pressure $Pt(\theta)$ measured at the rotational angle $\theta$ by the pressure sensor, calculate a plurality of parameters $Rt(\theta)$ based on a plurality of measured pressures $Pt(\theta)$ at different measurement times, and calculate a moving average $Rtj(\theta)$ of the parameter $Rt(\theta)$ at a measurement time tj that is a j-th measurement time of the measured pressure $Pt(\theta)$ ("j" representing a natural number of 2 or above). The gas pressure detection device includes a determining part configured to compare the moving average $Rtj(\theta)$ with a reference value R to detect the decrease in the pressure of the gas.

Preferably, the parameter $Rt(\theta)$ calculated by the calculating part is represented by the following Formula (1), based on the reference pressure $Pa(\theta)$ and the measured pressure $Pt(\theta)$ and using a coefficient A.

$$R_t(\theta) = A \frac{P_t(\theta)}{P_a(\theta)} \qquad (1)$$

Preferably, in the gas pressure detection device, the moving average $Rtj(\theta)$ calculated by the calculating part is represented by the following Formula (2), using the plurality of parameters $Rt(\theta)$ acquired from a time ti that is an i-th measurement time ("i" representing a natural number of 1 or above) to the time tj that is the j-th measurement time ("j" representing a natural number above "i").

$$R_{tj}(\theta) = \frac{1}{j-i+1} \sum_{t=ti}^{tj} R_t(\theta) \qquad (2)$$

Preferably, an interval of the measurement times of the plurality of measured pressures $Pt(\theta)$ to be used by the calculating part for the calculation of the moving average $Rtj(\theta)$ is 1 second or below.

Preferably, a measurement duration for acquiring the plurality of measured pressures $Pt(\theta)$ to be used by the calculating part for the calculation of the moving average $Rtj(\theta)$ is 10 seconds or above.

Preferably, the measurement duration for acquiring the plurality of measured pressures $Pt(\theta)$ to be used by the calculating part for the calculation of the moving average $Rtj(\theta)$ is 600 seconds or below.

A robot according to the present disclosure includes an arm supporting part, a rotary arm rotatably supported by the arm supporting part, a gas balancer configured to reduce a rotational load of the rotary arm, a pressure sensor configured to measure a pressure of gas in the gas balancer, and a gas pressure detection device configured to detect a decrease in the pressure. The gas pressure detection device includes a calculating part configured to calculate a parameter $Rt(\theta)$ indicating a magnitude relation between a reference pressure $Pa(\theta)$ at a rotational angle $\theta$ of the rotary arm and a measured pressure $Pt(\theta)$ measured at the rotational angle $\theta$ by the pressure sensor, calculate a plurality of parameters $Rt(\theta)$ based on a plurality of measured pressures $Pt(\theta)$ at different measurement times, and calculate a moving average $Rtj(\theta)$ of the parameter $Rt(\theta)$ at a measurement time tj that is a j-th measurement time of the measured pressure $Pt(\theta)$ (j representing a natural number of 2 or above). The gas pressure detection device includes a determining part configured to compare the moving average $Rtj(\theta)$ with a reference value R to detect the decrease in the pressure of the gas.

A method of detecting a pressure of gas according to the present disclosure detects a decrease in a pressure of gas of a gas balancer provided to a robot having an arm supporting part, a rotary arm rotatably supported by the arm supporting part, and a pressure sensor configured to measure the pressure of the gas of the gas balancer, the gas balancer being configured to reduce a rotational load of the rotary arm. The method includes the steps of (A) measuring the pressure of the gas of the gas balancer by the pressure sensor to acquire a measured pressure Pt(θ) at a rotational angle θ of the rotary arm, (B) calculating a parameter Rt(θ) indicating a magnitude relation between the measured pressure Pt(θ) and a reference pressure Pa(θ) at the rotational angle θ of the rotary arm, (C) calculating a plurality of parameters Rt(θ) based on a plurality of measured pressures Pt(θ) at different measurement times, and calculating a moving average Rtj(θ) of the parameter Rt(θ) at a measurement time tj that is a j-th measurement time of the measured pressure Pt(θ) (j representing a natural number of 2 or above), and (D) comparing the moving average Rtj(θ) with a reference value R to detect the decrease in the pressure of the gas.

Effect of the Disclosure

The gas pressure detection device according to the present disclosure calculates the parameter Rt(θ) indicating the magnitude relation between the reference pressure Pa(θ) and the measured pressure Pt(θ), and calculates the moving average Rtj(θ) of the parameter Rt(θ). Thus, a false detection due to a temporal pressure decrease of the gas balancer in the gas pressure detection device can be reduced. The gas pressure detection device contributes to the improvement in the productivity of robots.

MODE FOR CARRYING OUT THE DISCLOSURE

Hereinafter, the present disclosure is described in detail based on a preferred embodiment, suitably with reference to the drawings.

Figure 1:
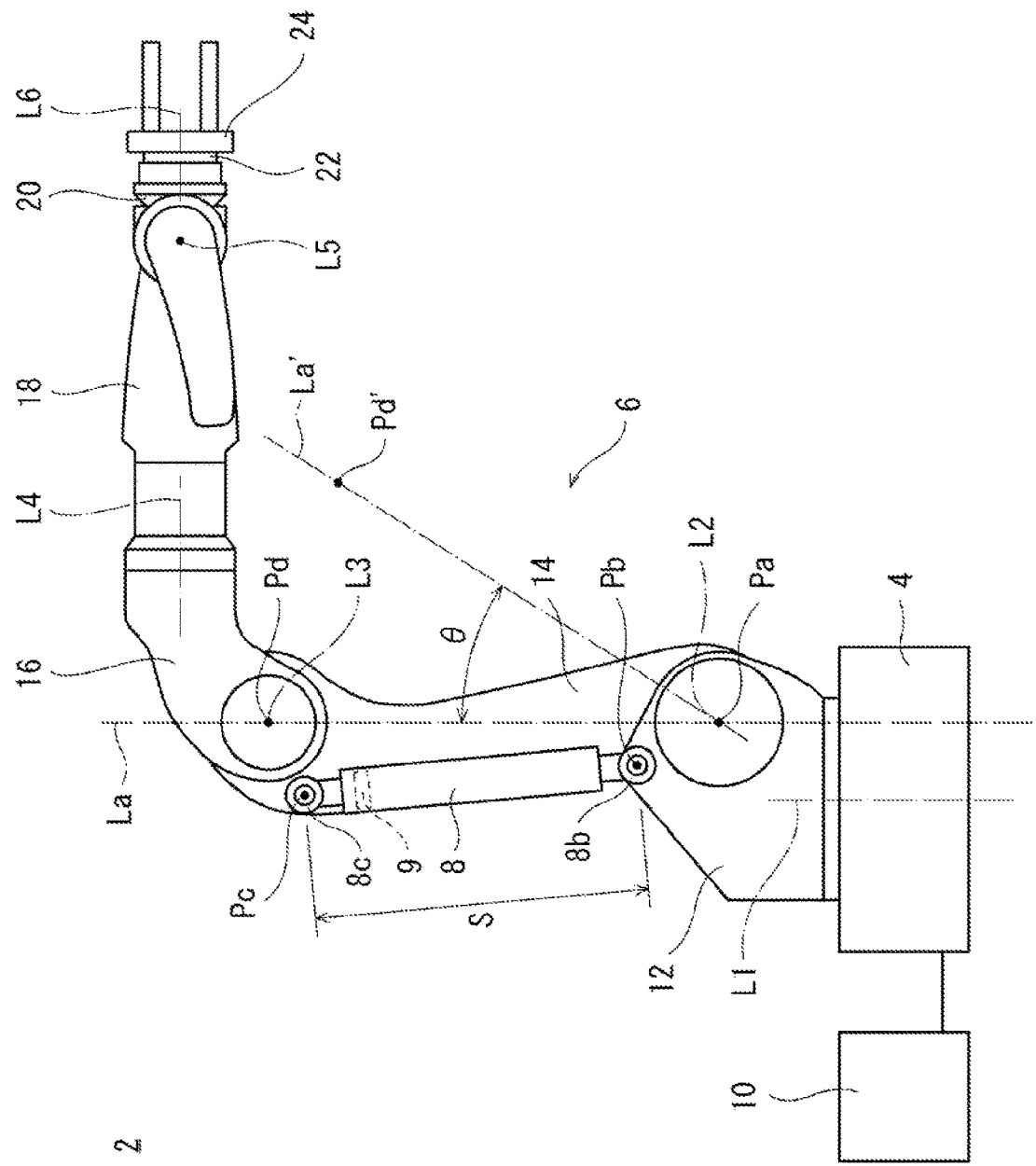
FIG. 1 is a side view illustrating an articulated robot according to one embodiment of the present disclosure.

FIG. 1 illustrates a robot 2 according to the present disclosure. The robot 2 includes a pedestal 4, a robotic arm 6, a gas balancer 8, a pressure sensor 9, and a gas pressure detection device 10. In this robot 2, the pressure sensor 9 is disposed inside the gas balancer 8. Although not illustrated here, this robot 2 further incudes drive motors M1 to M6 and rotation sensors E1 to E6.

The robotic arm 6 includes a first arm 12, a second arm 14, a third arm 16, a fourth arm 18, a fifth arm 20, and a sixth arm 22. In the robot 2, the pedestal 4, the first arm 12, the second arm 14, the third arm 16, the fourth arm 18, the fifth arm 20, and the sixth arm 22 are serially coupled to each other. The robot 2 includes a plurality of joints as coupling parts for them. The robot 2 is a so-called "multi-articulated robot."

As illustrated in FIG. 1, in the robot 2, a hand 24 is attached to a tip-end part of the sixth arm 22. The hand 24 has a function of grasping a workpiece (not illustrated). The hand 24 is an example of a tool to be attached to the robot 2, and other tools may be attached.

In the robot 2, the first arm 12 is coupled to the pedestal 4. The first arm 12 is rotatable on a vertical axis L1 as a rotational axis. The second arm 14 is coupled to the first arm 12. The second arm 14 is rotatable on a horizontal axis L2 as a rotational axis. The third arm 16 is coupled to the second arm 14. The third arm 16 is rotatable on a horizontal axis L3 as a rotational axis. The fourth arm 18 is coupled to the third arm 16. The fourth arm 18 is rotatable on an axis L4 as a rotational axis. The fifth arm 20 is coupled to the fourth arm 18. The fifth arm 20 is rotatable on an axis L5 perpendicular to the axis L4, as a rotational axis. The sixth arm 22 is coupled to the fifth arm 20. The sixth arm 22 is rotatable on an axis L6 as a rotational axis.

The drive motor M1 (not illustrated here) has a function of rotating the first arm 12. The drive motor M2 has a function of rotating the second arm 14. Similarly, the drive motor M3 has a function of rotating the third arm 16, the drive motor M5 has a function of rotating the fifth arm 20, the drive motor M4 has a function of rotating the fourth arm 18, and the drive motor M6 has a function of rotating the sixth arm 22. The drive motors M1, M2, M3, M4, M5, and M6 are servomotors, for example.

The rotation sensor E1 has a function of detecting a rotational position of the drive motor M1. The rotation sensor E2 has a function of detecting a rotational position of the drive motor M2. Similarly, the rotation sensors E3, E4, E5, and E6 have a function of detecting rotational positions of the drive motors M3, M4, M5, and M6, respectively. These rotation sensors E1, E2, E3, E4, E5, and E6 are encoders, for example.

Gas is filled in the gas balancer 8. The gas balancer 8 is extendable and contractible. As the gas balancer 8 extends or contracts, a pressure of the filled gas varies. According to this variation in the gas pressure, a stretching force of the gas balancer 8 varies. This gas balancer 8 is pivotably attached at its base-end part 8b to the first arm 12. A tip-end part 8c of the gas balancer 8 is pivotably attached to the second arm 14.

A reference character Pa in FIG. 1 indicates a rotational center of the second arm 14. A reference character Pb indicates a rotational center of the base-end part 8b of the gas balancer 8. A reference character Pc indicates a rotational center of the tip-end part 8c of the gas balancer 8. A reference character Pd indicates a rotational center of the third arm 16. A one-dot chain line La indicates a straight line extending to pass the rotational center Pa and the rotational center Pd. A double arrow S indicates a distance between the rotational center Pb and the rotational center Pc.

A reference character Pd' indicates a rotational position of the rotational center Pd when the second arm 14 rotates from the posture in FIG. 1. A one-dot chain line La' indicates a straight line extending across the rotational center Pa and the rotational position Pd'. A double arrow θ indicates a rotational angle of the second arm 14. The rotational angle θ is an angle formed by the straight line La and the straight line La'. The rotational angle θ of the second arm 14 is 0° when the second arm 14 is in the posture in FIG. 1. The rotational angle θ is represented as a positive angle when the second arm 14 rotates clockwise from the posture in FIG. 1, and is represented as a negative angle when it rotates counterclockwise.

By the second arm 14 rotating with respect to the first arm 12, the distance S of the gas balancer 8 varies. The gas balancer 8 extends and contracts according to the variation in the distance S. By the extension and contraction, the stretching force of the gas balancer 8 changes between the rotational center Pb and the rotational center Pc. By the stretching force, the gas balancer 8 supports a load acting on the second arm 14 so as to reduce a rotational load of the drive motor M2.

The pressure sensor 9 is attached to the gas balancer 8. In the robot 2, the pressure sensor 9 is attached inside the gas balancer 8. The pressure sensor 9 has a function of measuring the pressure of the gas filled in the gas balancer 8. The pressure sensor 9 may be attached outside the gas balancer 8.

Figure 2:
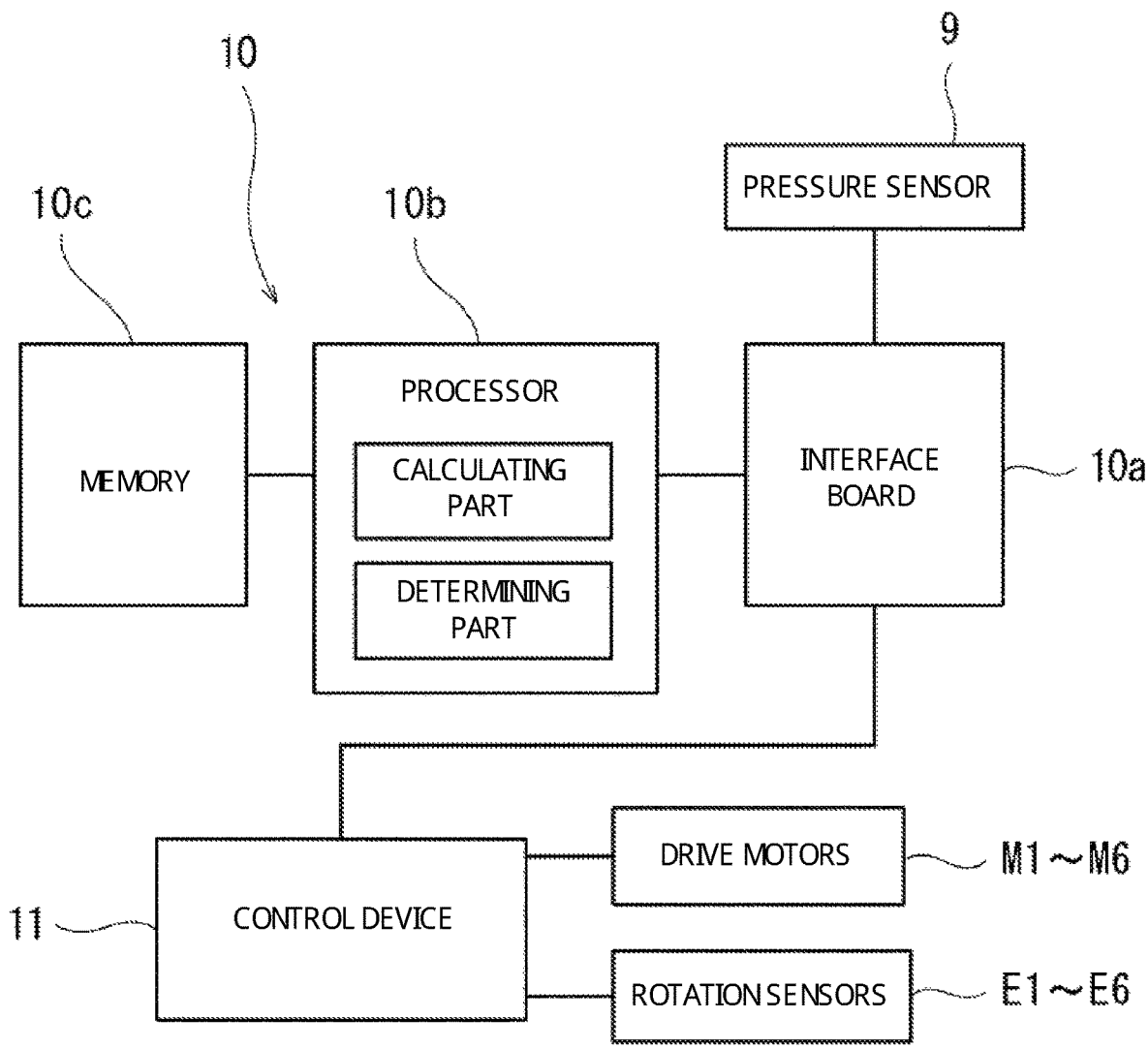
FIG. 2 is a block diagram illustrating a configuration of a pressure detection device of the robot in FIG. 1.

As illustrated in FIG. 2, the robot 2 further includes a control device 11 which controls operation of the robotic arm 6. The control device 11 has a function of receiving rotational position data of the drive motors (M1, M2, M3, M4, M5, and M6) from the rotation sensors (E1, E2, E3, E4, E5, and E6). The control device 11 has a function of calculating rotational positions of the first arm 12, the fourth arm 18, and the sixth arm 22. The control device 11 has a function of calculating rotational positions of the second arm 14, the third arm 16, and the fifth arm 20. The control device 11 has a function of controlling the drive motors (M1, M2, M3, M4, M5, and M6).

The gas pressure detection device 10 includes an interface board 10a as a data input/output part, a processor 10b as a computing part, and a memory 10c as a storage part for data.

The interface board 10a has a function of receiving rotational position data (rotational angle θ) of the second arm 14, from the control device 11. The interface board 10a has a function of receiving data of a measured pressure Pt(θ) measured by the pressure sensor 9. The interface board 10a has a function of transmitting a signal indicative of pressure abnormality, to an alert device etc.

The processor 10b includes a calculating part to calculate a parameter Rt(θ) which indicates a magnitude relation between a reference pressure Pa(θ) and the measured pressure Pt(θ), and a moving average Rtj(θ) of this parameter Rt(θ) (described later). The processor 10b further includes a determining part which compares the moving average Rtj(θ) with a reference value R to detect the pressure decrease. The processor 10b has a function of causing the interface board 10a to transmit the signal of pressure abnormality, when it detects the pressure decrease. The processor 10b may calculate the rotational angle θ based on the rotational position data received by the interface board 10a.

The memory 10c has a function of storing the rotational angle θ of the second arm 14 and the reference pressure Pa(θ) at the rotational angle θ. This reference pressure Pa(θ) is an allowable pressure at which the gas balancer 8 can operate at the rotational angle θ (operation-allowable pressure). The memory 10c has a function of storing the measured pressure Pt(θ) acquired from the pressure sensor 9, and the rotational angle θ at which the measured pressure Pt(θ) is measured, so that they are associated with each other.

Figure 3:
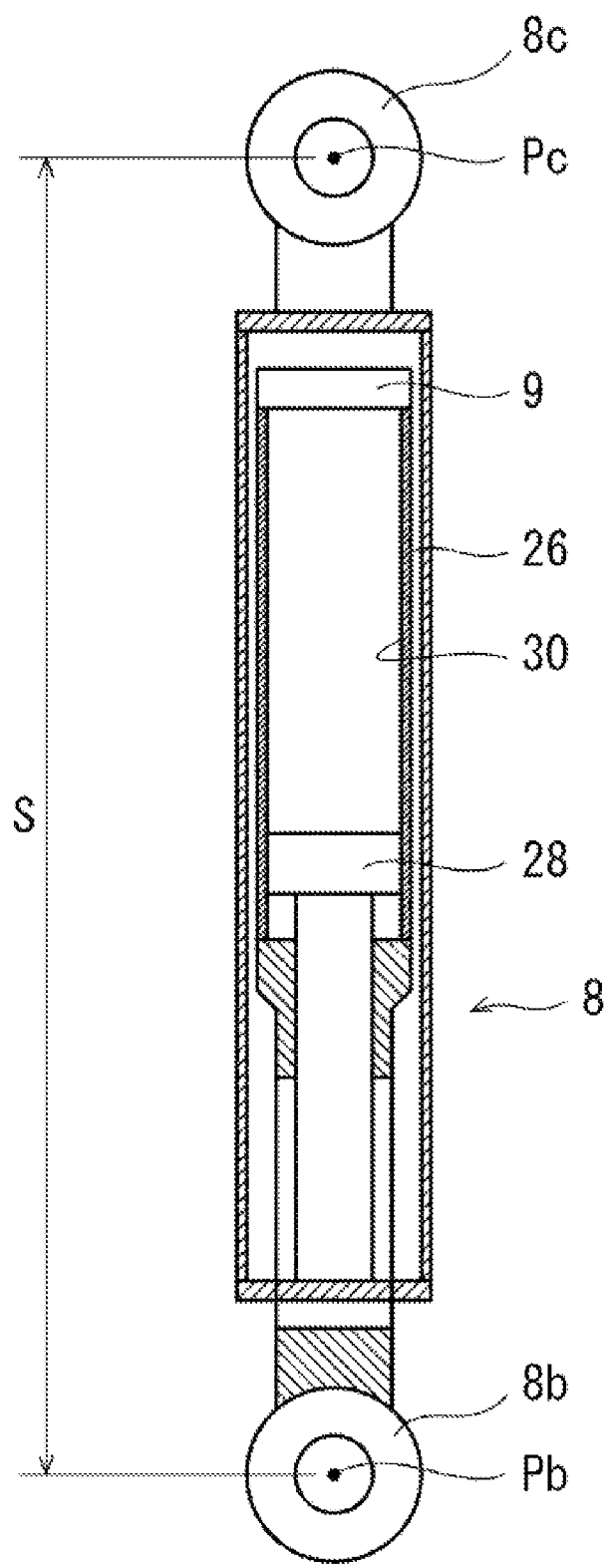
FIG. 3 is an explanatory view illustrating a gas balancer of the robot in FIG. 1.

As illustrated in FIG. 3, the gas balancer 8 includes a cylinder 26 and a piston 28. The cylinder 26 is coupled to the base-end part 8b. The piston 28 is coupled to the tip-end part 8c. The piston 28 is slidably inserted into the cylinder 26. The piston 28 and the cylinder 26 form a gas chamber 30. High-pressure gas is filled in the gas chamber 30. The gas is, although not particularly limited, an inactive gas, for example. The gas balancer 8 extends and contracts as the distance S changes. The extension and contraction change a volume of the gas chamber 30. This change in the volume brings a change in the pressure of the gas. The pressure sensor 9 measures the gas pressure.

In this gas balancer 8, when its entire length extends, the extension and contraction force acts in a direction to which the entire length contracts. Accordingly, the gas balancer 8 reduces the rotational load of the drive motor M2. The gas balancer 8 may have any configuration, as long as it reduces the rotational load of the drive motor M2. The gas balancer 8 may be configured so that, when its entire length contracts, the extension and contraction force acts in a direction to which the entire length extends. The gas balancer 8 may be configured to reduce the rotational load of the drive motor M2 by the extension and contraction force acting in the direction to which the entire length of the gas balancer 8 extends, when the entire length contracts.

Figure 4:
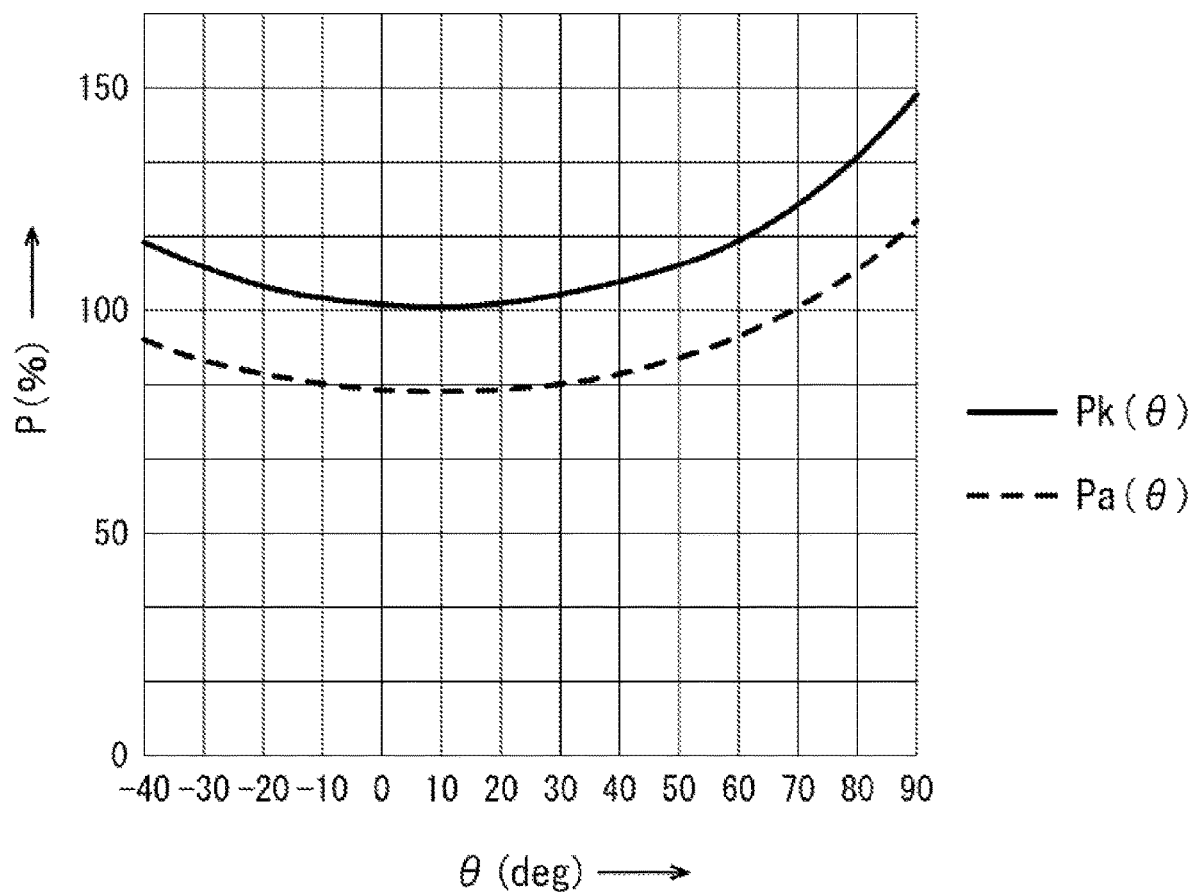
FIG. 4 is a graph illustrating relations of a rotational angle θ of a rotary arm of the robot in FIG. 1, with a theoretical pressure Pk(θ) and with a reference pressure Pa(θ) of the gas balancer.

FIG. 4 illustrates relations of the rotational angle θ of the second arm 14 with a theoretical pressure Pk(θ), and with the reference pressure Pa(θ) of the gas balancer 8. The theoretical pressure Pk(θ) is a pressure calculated based on the volume of the gas chamber 30 at the rotational angle θ. In the robot 2, when the rotational angle θ of the second arm 14 is 9°, the gas chamber 30 has a maximum volume and the theoretical pressure Pk(θ) becomes minimum. In FIG. 4, the theoretical pressure Pk(θ) and the reference pressure Pa(θ) are represented as indexes assuming that the theoretical pressure Pk(θ) at the rotational angle θ of 9° is 100%. The reference pressure Pa(θ) represents the operation-allowable pressure at the rotational angle θ. The reference pressure Pa(θ) may be calculated by any method, as long as it is a reference pressure used in determining whether the second arm 14 can operate at the pressure. The reference pressure Pa(θ) may be, for example, a pressure calculated as a product obtained by multiplying the theoretical pressure Pk(θ) by a positive coefficient B which is below 1, or a pressure calculated by subtracting a given pressure from the theoretical pressure Pk(θ).

Here, a method of detecting a decrease in the gas pressure according to the present disclosure using the robot 2 is described. Here, the method is exemplarily described as the detection of the gas pressure decrease in the gas balancer 8. Here, the first arm 12 is an arm supporting part, and the second arm 14 is a rotary arm.

The memory 10c of the gas pressure detection device 10 stores the rotational angle θ and the reference pressure Pa(θ) at the rotational angle θ. The interface board 10a receives the rotational angle θ and the measured pressure Pt(θ) (STEP 1). The memory 10c stores the rotational angle θ and the measured pressure Pt(θ), each time at a given time interval. For example, in the gas pressure detection device 10, n rotational angles θ and measured pressures Pt(θ) corresponding to times t from a time t1 to a time tn ("n" is a natural number), are stored.

The processor 10b (calculating part) of the gas pressure detection device 10 calculates the parameter Rt(θ) indicating the magnitude relation between the reference pressure Pa(θ) and the measured pressure Pt(θ) at the rotational angle θ (STEP 2). In detail, for example, the parameter Rt(θ) is calculated using the coefficient A, based on a ratio represented by the following Formula (1).

$$R_t(\theta) = A \frac{P_t(\theta)}{P_a(\theta)} \quad (1)$$

The processor 10b calculates a plurality of parameters Rt(θ) based on a plurality of measured pressures Pt(θ) which are acquired at the given time interval. The processor 10b calculates the moving average Rtj(θ) at a time tj, based on the plurality of parameters Rt(θ) (STEP 3). In detail, the moving average Rtj(θ) is calculated based on the following Formula (2), for example. In Formula (2), Rtj(θ) represents a moving average at the time tj which is a j-th time ("j" is a natural number of "n" or below). This moving average Rtj(θ) is calculated as an average of the parameters Rt(θ) acquired from a time ti which is an i-th time ("i" is a natural number below "j") to the time tj.

$$R_{tj}(\theta) = \frac{1}{j-i+1} \sum_{t=ti}^{tj} R_t(\theta) \quad (2)$$

The processor 10b (determining part) of the gas pressure detection device 10 compares the moving average Rtj(θ) with the stored reference value R to detect the gas pressure decrease in the gas balancer 8 (STEP 4). The gas pressure detection device 10 repeats the calculation of the moving average Rtj(θ) at the given time interval. For example, if the moving average Rtj(θ) is the reference value R or above, the processor 10b determines that the pressure of the gas balancer 8 is within an operation-allowable range. If the moving average Rtj(θ) is below the reference value R, the processor 10b determines that the pressure of the gas balancer 8 is below the operation-allowable range. In such a case, the processor 10b causes the interface board 10a to transmit the signal of pressure abnormality. In response to this signal of pressure abnormality, an alert lamp etc. is lightened, and the robot 2 is stopped.

Figure 5:
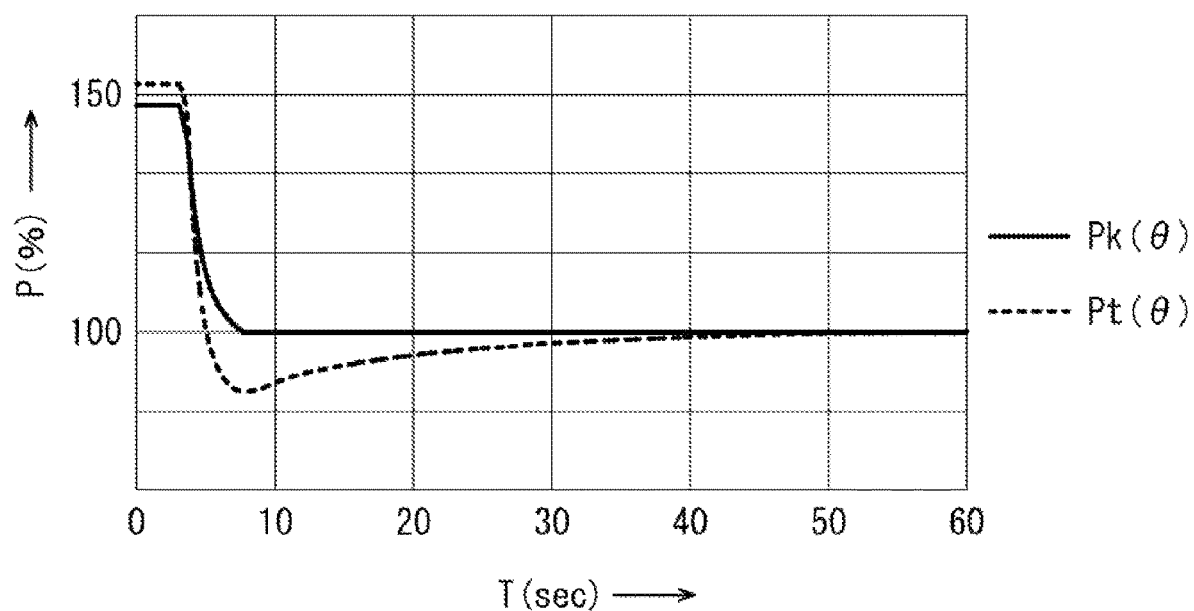
FIG. 5 is a graph illustrating a relation between the theoretical pressure Pk(θ) and a measured pressure Pt(θ) of the gas balancer when the rotary arm of the robot in FIG. 1 is rotated.

FIG. 5 illustrates a relation between the actual measured pressure Pt(θ) and the theoretical pressure Pk(θ) when the second arm 14 is rotated. In FIG. 5, the theoretical pressure Pk(θ) and the measured pressure Pt(θ) are represented as indexes assuming that the theoretical pressure Pk(θ) at the rotational angle θ of 9°, is 100%. In this FIG. 5, the measured pressure Pt(θ) is illustrated as a pressure acquired by the pressure sensor 9 when the second arm 14 is rotated at the rotational angle θ of 90° and then at 9°. Similar to the acquiring the measured pressure Pt(θ), the theoretical pressure Pk(θ) is illustrated as a pressure acquired when the second arm 14 is rotated.

In FIG. 5, when the second arm 14 is rotated at the rotational angle θ of 90°, the gas balancer 8 extends to reduce the volume of the gas chamber 30. The gas filled in the gas chamber 30 is compressed. Here, the theoretical pressure Pk(θ) is about 148(%). When the second arm 14 is rotated at the rotational angle θ of 9°, the gas balancer 8 contracts to increase the volume of the gas chamber 30. The gas filled in the gas chamber 30 is expanded. Here, the theoretical pressure Pk(θ) is 100(%). By the rotation of the second arm 14, the theoretical pressure Pk(θ) changes from about 148(%) to 100(%).

On the other hand, when the second arm 14 is rotated at the rotational angle θ of 90°, the actual measured pressure Pt(θ) is about 152(%). This measured pressure Pt(θ) is higher than the theoretical pressure Pk(θ) of about 148(%). When the second arm 14 is rotated at the rotational angle θ of 9°, the measured pressure Pt(θ) decreases to about 88(%), and then gradually increases to about 100(%) as the time T (sec.) passes. The difference between the measured pressure Pt(θ) and the theoretical pressure Pk(θ) gradually decreases as the time passes.

As illustrated in FIG. 5, the difference arises between the theoretical pressure Pk(θ) and the measured pressure Pt(θ). This pressure difference temporarily increases when the second arm 14 is rotated. This is because the gas filled in the gas chamber 30 undergoes a temporal pressure change similar to an adiabatic change upon the rotation of the second arm 14. In detail, in this gas chamber 30, when the gas filled therein expands, the gas temperature decreases. Also this decrease in the temperature causes the pressure decrease, in addition to the pressure decrease due to the change in the volume of the gas chamber 30. Then, the pressure gradually increases, as the gas temperature increases. Similarly, when the gas is compressed, the gas temperature increases. Also this increase in the temperature causes a pressure increase, in addition to the pressure increase due to the change in the volume of the gas chamber 30. Then, the pressure gradually decreases, as the gas temperature decreases. Such phenomena result in the measured pressure Pt(θ) as illustrated in FIG. 5.

In the method of detecting the pressure decrease as described above, the gas pressure detection device 10 calculates a ratio of the measured pressure Pt(θ) to the reference pressure Pa(θ) (i.e., Pt(θ)/Pa(θ)) as the parameter Rt(θ). Based on the calculation of the parameter Rt(θ), the magnitude relation between the measured pressure Pt(θ) and the reference pressure Pa(θ) for each measurement time t is evaluated. The gas pressure detection device 10 further calculates the moving average Rtj(θ) of the parameter Rt(θ). By using the moving average Rtj(θ), the gas pressure detection device 10 is less influenced by the temporal difference between the theoretical pressure Pk(θ) and the measured pressure Pt(θ). This suppresses the false detection of the decrease in the gas pressure of the gas balancer 8.

By reducing the interval of measurement time t at which the measurement pressure Pt(θ) is acquired, changes in the gas pressure can be accurately grasped. From this viewpoint, the interval of the measurement time t is preferably 1 second or below, more preferably 0.5 second or below, particularly preferably 0.1 second or below. This interval of the measurement time t does not have any particular lower limit. The interval of the measurement time t may be at or above a lower limit of a measurement interval determined depending on the performance of the pressure sensor 9.

By increasing the measurement duration (time period from the time ti to the time tj) in which the measurement pressure Pt(θ) is acquired, the influence of the temporal difference due to the rotation of the second arm 14 can be reduced. From this viewpoint, the time period is preferably 10 seconds or above, more preferably 30 seconds or above, particularly preferably 60 seconds or above. Since the influence of the temporal difference can be reduced as the measurement duration increases, the measurement duration may be 200 seconds or above, for example. Although the measurement duration does not have any particular upper limit, if the duration is long, the gas pressure detection device 10 delays in detecting the pressure decrease. From a viewpoint of rapid detection of the pressure decrease, the duration is preferably 600 seconds or below.

The parameter Rt(θ) is not limited to the ratio (Pt(θ)/Pa(θ)), as long as it indicates the magnitude relation between the reference pressure Pa(θ) and the measured pressure Pt(θ). For example, the parameter Rt(θ) may be based on the difference between the reference pressure Pa(θ) and the measured pressure Pt(θ). In detail, the gas pressure detection device 10 calculates the difference ($Pt(\theta)-Pa(\theta)$) between the reference pressure $Pa(\theta)$ and the measured pressure $Pt(\theta)$, as the parameter $Rt(\theta)$. If the moving average $Rtj(\theta)$ calculated based on the parameter $Rt(\theta)$ is below a given value (e.g., 0), the gas pressure detection device 10 may detect that the gas pressure is below the operation-allowable pressure. As the parameter $Rt(\theta)$, a product of multiplying the difference ($Pt(\theta)-Pa(\theta)$) by the coefficient A may be used. Moreover, a ratio of the difference ($Pt(\theta)-Pa(\theta)$) relative to the reference pressure $Pa(\theta)$ or the measured pressure $Pt(\theta)$ may be calculated.

Although in the robot 2 the second arm 14 is described as the rotary arm of the present disclosure and the first arm 12 is described as the arm supporting part of the present disclosure, it is not limited to this configuration. For example, a gas spring may be provided between the second arm 14 and the third arm 16 so that the second arm 14 is the arm supporting part and the third arm 16 is the rotary arm. Similarly, a gas spring may be provided between the fourth arm 18 and the fifth arm 20 so that the fourth arm 18 is the arm supporting part and the fifth arm 20 is the rotary arm. Although the robot 2 according to the present disclosure is exemplarily described as a multi-articulated robot, the robot 2 may be any articulated robot including the arm supporting part and the rotary arm.

DESCRIPTION OF REFERENCE CHARACTERS

2 . . . Robot
4 . . . Pedestal
6 . . . Robotic Arm
8 . . . Gas Balancer
9 . . . Pressure Sensor
10 . . . Gas Pressure Detection Device
10a . . . Interface Board
10b . . . Processor
10c . . . Memory
12 . . . First Arm (Arm Supporting Part)
14 . . . Second Arm (Rotary Arm)
26 . . . Cylinder
28 . . . Piston
30 . . . Gas Chamber

The invention claimed is:

1. A gas pressure detection device provided to a robot having an arm supporting part, a rotary arm rotatably supported by the arm supporting part, a gas balancer configured to reduce a rotational load of the rotary arm, and a pressure sensor configured to measure a pressure of gas of the gas balancer, the gas pressure detection device being configured to detect a decrease in the pressure of the gas of the gas balancer and comprising:
a calculating part configured to calculate a parameter $Rt(\theta)$ indicating a magnitude relation between a reference pressure $Pa(\theta)$ at a rotational angle $\theta$ of the rotary arm and a measured pressure $Pt(\theta)$ measured at the rotational angle $\theta$ by the pressure sensor, calculate a plurality of parameters $Rt(\theta)$ based on a plurality of measured pressures $Pt(\theta)$ at different measurement times, and calculate a moving average $Rtj(\theta)$ of the parameter $Rt(\theta)$ at a measurement time tj that is a j-th measurement time of the measured pressure $Pt(\theta)$, j representing a natural number of 2 or above;
a determining part configured to compare the moving average $Rtj(\theta)$ with a reference value R to detect the decrease in the pressure of the gas; and
a stopping part configured to stop the robot when the moving average $Rtj(\theta)$ is below the reference value R.

2. The gas pressure detection device of claim 1, wherein the parameter $Rt(\theta)$ calculated by the calculating part is represented by the following Formula (1), based on the reference pressure $Pa(\theta)$ and the measured pressure $Pt(\theta)$ and using a coefficient A:

$$R_t(\theta) = A \frac{P_t(\theta)}{P_a(\theta)}. \tag{1}$$

3. The gas pressure detection device of claim 1, wherein the moving average $Rtj(\theta)$ calculated by the calculating part is represented by the following Formula (2), using the plurality of parameters $Rt(\theta)$ acquired from a time ti that is an i-th measurement time to the time tj that is the j-th measurement time, i representing a natural number of 1 or above and j representing a natural number above i:

$$R_{tj}(\theta) = \frac{1}{j-i+1} \sum_{t=ti}^{tj} R_t(\theta). \tag{2}$$

4. The gas pressure detection device of claim 1, wherein an interval of the measurement times of the plurality of measured pressures $Pt(\theta)$ to be used by the calculating part for the calculation of the moving average $Rtj(\theta)$ is 1 second or below.

5. The gas pressure detection device of claim 1 wherein a measurement duration for acquiring the plurality of measured pressures $Pt(\theta)$ to be used by the calculating part for the calculation of the moving average $Rtj(\theta)$ is 10 seconds or above.

6. The gas pressure detection device of claim 5, wherein the measurement duration for acquiring the plurality of measured pressures $Pt(\theta)$ to be used by the calculating part for the calculation of the moving average $Rtj(\theta)$ is 600 seconds or below.

7. A robot, comprising an arm supporting part, a rotary arm rotatably supported by the arm supporting part, a gas balancer configured to reduce a rotational load of the rotary arm, a pressure sensor configured to measure a pressure of gas in the gas balancer, and a gas pressure detection device configured to detect a decrease in the pressure of the gas of the gas balancer,
wherein the gas pressure detection device includes:
a calculating part configured to calculate a parameter $Rt(\theta)$ indicating a magnitude relation between a reference pressure $Pa(\theta)$ at a rotational angle $\theta$ of the rotary arm and a measured pressure $Pt(\theta)$ measured at the rotational angle $\theta$ by the pressure sensor, calculate a plurality of parameters $Rt(\theta)$ based on a plurality of measured pressures $Pt(\theta)$ at different measurement times, and calculate a moving average $Rtj(\theta)$ of the parameter $Rt(\theta)$ at a measurement time tj that is a j-th measurement time of the measured pressure $Pt(\theta)$, j representing a natural number of 2 or above;
a determining part configured to compare the moving average $Rtj(\theta)$ with a reference value R to detect the decrease in the pressure of the gas; and
a stopping part configured to stop the robot when the moving average $Rtj(\theta)$ is below the reference value R.

8. A method of detecting a decrease in a pressure of gas of a gas balancer provided to a robot having an arm supporting part, a rotary arm rotatably supported by the arm supporting part, and a pressure sensor configured to measure the pressure of the gas of the gas balancer, the gas balancer being configured to reduce a rotational load of the rotary arm, the method comprising the steps of:
- (A) measuring the pressure of the gas of the gas balancer by the pressure sensor to acquire a measured pressure $Pt(\theta)$ at a rotational angle $\theta$ of the rotary arm;
- (B) calculating a parameter $Rt(\theta)$ indicating a magnitude relation between the measured pressure $Pt(\theta)$ and a reference pressure $Pa(\theta)$ at the rotational angle $\theta$ of the rotary arm;
- (C) calculating a plurality of parameters $Rt(\theta)$ based on a plurality of measured pressures $Pt(\theta)$ at different measurement times, and calculating a moving average $Rtj(\theta)$ of the parameter $Rt(\theta)$ at a measurement time tj that is a j-th measurement time of the measured pressure $Pt(\theta)$, j representing a natural number of 2 or above;
- (D) comparing the moving average $Rtj(\theta)$ with a reference value R to detect the decrease in the pressure of the gas; and
- (E) stopping the robot when the moving average $Rtj(\theta)$ is below the reference value R.

* * * * *